June 9, 1936.  J. W. HUGHES  2,043,664
CABINET
Filed Aug. 10, 1934   3 Sheets-Sheet 1
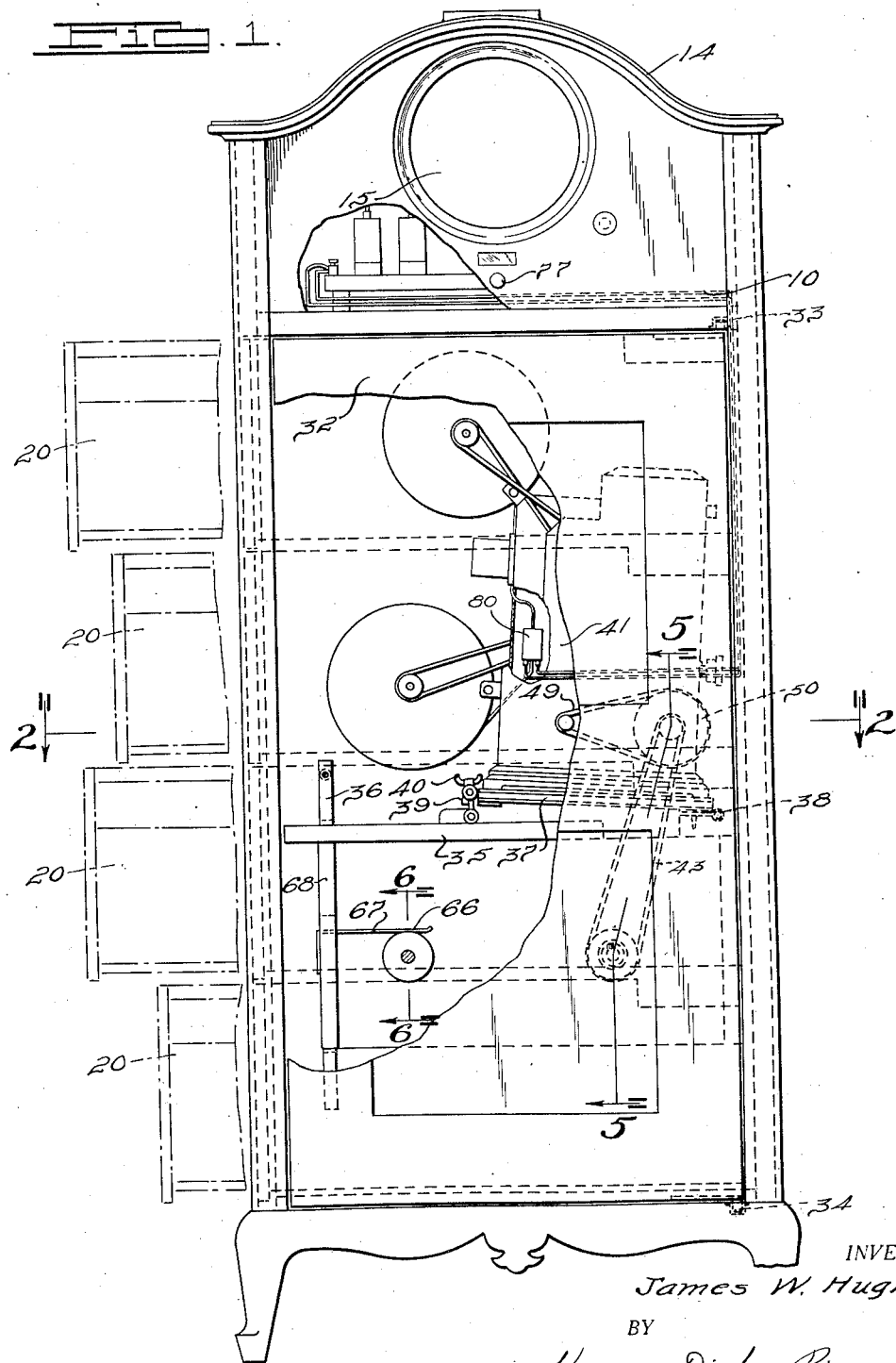
INVENTOR.
James W. Hughes.
BY
Harness, Dickey, Pierce & Hann.
ATTORNEYS.

June 9, 1936.    J. W. HUGHES    2,043,664
CABINET
Filed Aug. 10, 1934    3 Sheets-Sheet 2
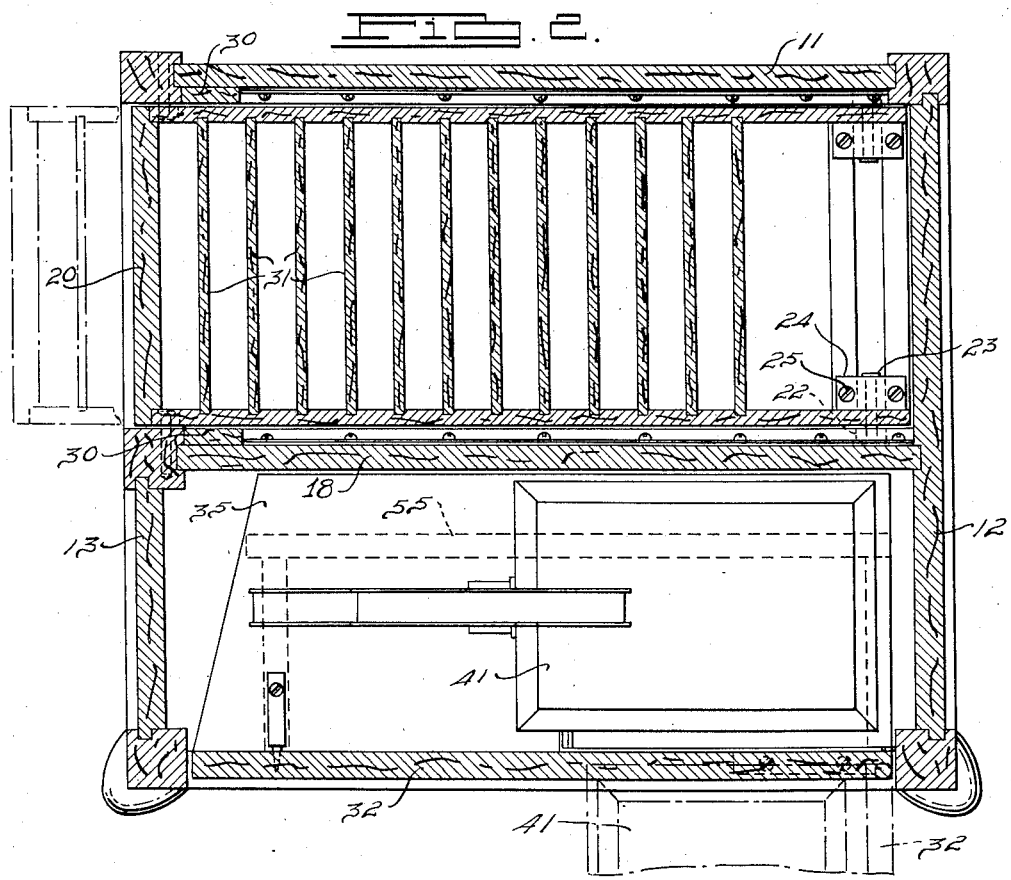
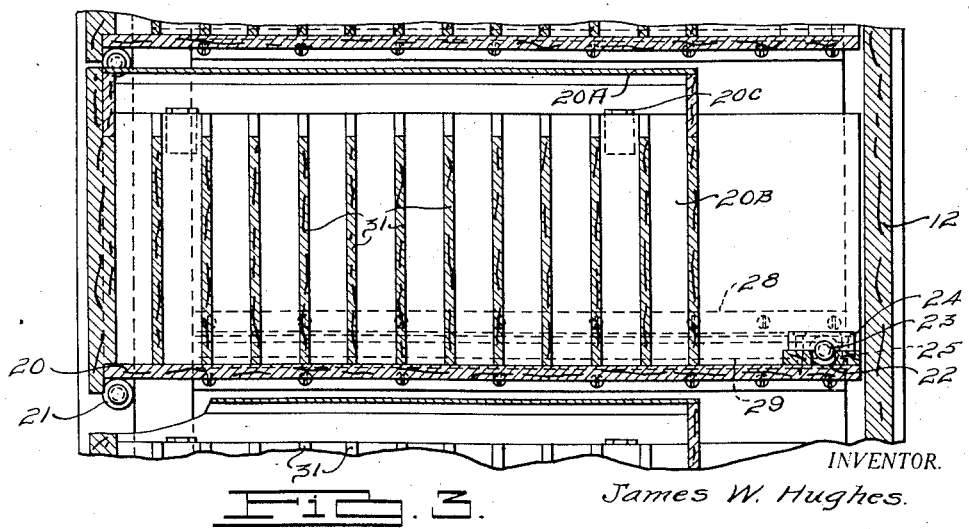
INVENTOR.
James W. Hughes.
BY
ATTORNEYS.

June 9, 1936. J. W. HUGHES 2,043,664
CABINET
Filed Aug. 10, 1934 3 Sheets-Sheet 3
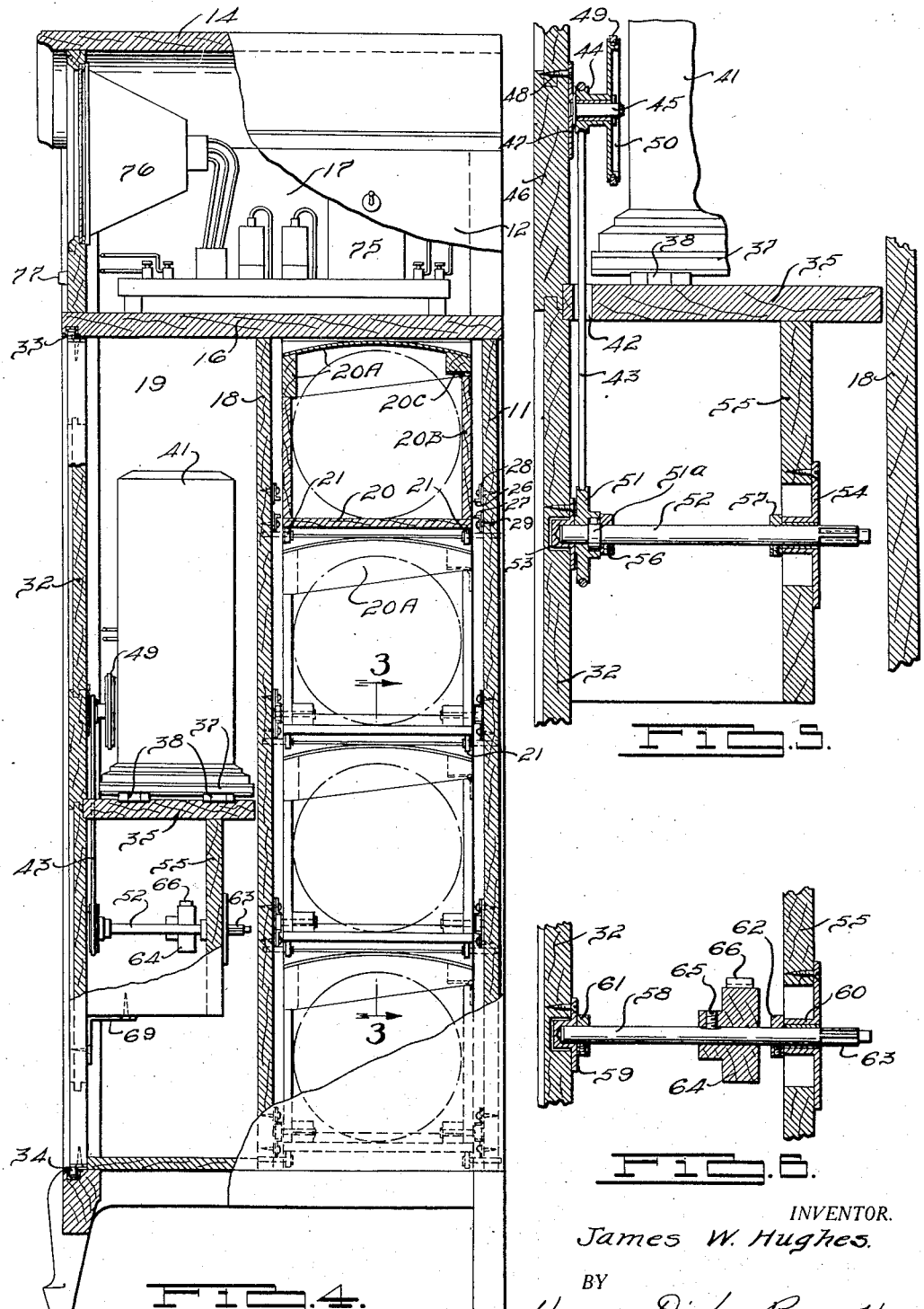
INVENTOR.
James W. Hughes.
BY
Harness, Dickey, Pierce & Hann.
ATTORNEYS.

Patented June 9, 1936

2,043,664

UNITED STATES PATENT OFFICE 2,043,664

CABINET

James W. Hughes, Grosse Pointe, Mich.

Application August 10, 1934, Serial No. 739,227

2 Claims. (Cl. 88—24)

This invention relates to cabinets particularly adapted for housing motion picture projectors of the "home movie" type and film reels therefor, a portion thereof being adapted to house a radio or the like.

Heretofore it has been the general custom to store motion picture projectors of the "home movie" type in closets, on shelves and such places. Reels of film are usually stored in bureau drawers or piled on shelves in an unsystematic manner. The projector, when thus stored, is subject to injury and having its mechanism fouled with dust and dirt.

In the past, when it was desired to show a reel of film to a friend, it has been considerable of a nuisance to get out the projector, mount it on a table or stand, then usually block it up with books or magazines until the desired height of projection was secured. Then a search was instituted for the desired reel of film. The result has been that home movies are not used and enjoyed nearly as much as they should be.

The main objects of this invention are: to provide a cabinet in which a motion picture projector and a number of film reels may be conveniently stored and protected from dust, dirt or injury and yet be quickly and readily accessible for use with a minimum of effort; to provide an improved construction of cabinet having a door on the front thereof or other movable member, upon the back of which is provided suitable means for supporting a motion picture projector; to provide a cabinet of a character as above described in which a motion picture projector may be housed from sight but quickly and readily brought into projection position in focus with a screen located permanently or semi-permanently in proper focal relation to the projector; to provide a construction in which systematic storage facilities are provided for a large number of film reels, and to provide a combined arrangement of cabinet, projector supporting cabinet door and film reel drawers which permits the operator to remove reels from the drawers, place them in the projecting machine, rewind the film reels and replace them in the drawers from one position or location without moving about the cabinet.

An illustrative embodiment of this invention is shown in the accompanying drawings, in which—

Fig. 1 is a view in front elevation of my improved cabinet, a portion of the door being broken away to show the interior construction and arrangement, and fragmentary portions of the film storage drawers in partially open position being shown in broken outline.

Fig. 2 is a horizontal section taken on the line 2—2 of Fig. 1 looking in the direction indicated.

Fig. 3 is a fragmentary vertical section taken on the line 3—3 of Fig. 4.

Fig. 4 is a view in end elevation, partly broken away to show the interior construction and arrangement.

Fig. 5 is an enlarged sectional detail view taken on the line 5—5 of Fig. 1.

Fig. 6 is an enlarged fragmentary sectional detail view taken on the line 6—6 of Fig. 1.

In the construction shown in the drawings, the cabinet comprises a front side 10, rear side 11, ends 12 and 13 and a top 14. In the particular construction shown, the construction is of the character utilizing corner posts with panels therebetween, but it is to be understood that any type of construction may be employed.

The upper part of the front side 10 is a stationary panel having a circular cut-out therein covered by a grill or screen 15 in the usual manner of radio loud-speakers, and a horizontally disposed partition 16 is provided in spaced relation to the top 14 to form a compartment 17 adapted to house a radio or the like.

In the arrangement shown, a radio generally designed at 75 is provided with a loud speaker 76, the radio amplifying circuit of which is connected through a two-way switch 77 so that it may be operated from the radio amplifying circuits in the usual manner or may be operated to reproduce talking moving pictures, as will be hereinafter described.

That portion of the cabinet below the partition 16 is divided lengthwise by a vertically disposed partition 18 located medially of and substantially parallel to the front and rear sides of the cabinet so as to provide a recess or compartment 19 at the front of the cabinet and provide a compartment adjacent the back wall of the cabinet for receiving a plurality of superimposed film reel drawers 20. These drawers are all of like construction and are preferably mounted to slide on rollers 21 journaled on stud pins mounted in the partition 18 and back wall 11 at the front ends of the drawers.

The rear ends of the drawers are provided with rollers 22 journaled on stud pins which are rigidly secured to the drawers by clips 24 anchored by screws 25. The rollers 22 are adapted to be loosely embraced between the spaced parallel flanges 26 and 27 of angle irons 28 and 29 respectively, which are secured to the inner side of the back wall 11 and the partition 18 by screws or the like. Each set of angle irons and rollers are of identical construction and, therefore, only one set need be particularly described.

The rollers 22 definitely guide the back ends of the drawers, the lower flange supporting the weight of the drawer when in closed position and the upper flange holding the drawer in level position and taking the strain thereof when the drawer is withdrawn from the cabinet, it being understood that these drawers when loaded with reels of film are relatively heavy. Strips of wood 30 are provided at the front ends of the angle irons in abutting relation thereto for engaging the rollers 22 mounted on the rear ends of the drawers, thereby preventing the drawers from being pulled entirely out of the cabinet.

Each of the drawers is provided with a plurality of vertically disposed spaced, parallel, transverse partitions 31, which form a plurality of compartments adapted to receive film reels supported on edge in spaced parallel relation. Each of the drawers is preferably provided with a cover 20A hinged to the rear side wall 20B by hinges 20C, these covers extending over only that portion of the drawer which is sub-divided into individual compartments for the film reels, a space being left at the back of each drawer which is partially within the cabinet when the drawer is withdrawn until the rollers 22 abut against the strips 30.

The front of the cabinet is provided with a horizontally swingable door 32 supported on vertical pivots or trunnions 33 and 34 at the top and bottom edges thereof closely adjacent to that end of the cabinet which is opposite to the end from which the drawers are withdrawn, this being one of the features of the general construction and which permits the operator to stand at the side of the cabinet adjacent to the open drawers and have the front door of the cabinet swing away from him so that he faces the inside of the door.

The inside of the door 32 is provided with a horizontally disposed shelf 35 rigidly secured thereto by brackets 36 and preferably mortised into the door panel. A leaf 37 is adjustably secured to the top side of the shelf 35 by hinges 38 at one end thereof and the other end of the said leaf is attached to a vertical adjusting screw 39 so that its position may be raised or lowered by turning a thumb nut 40. The leaf 37 is adapted to have a motion picture projector 41 mounted thereon, the said projector being adjustable to raise or lower the height of projection by adjustment of the leaf up or down with respect to the shelf 35.

The projector 41 is provided with a photo-electric cell 80 or similar light responsive electric current controlling device, mounted in position so as to be actuated by sound gradations photographed on the film, and the circuit 81 thereto is connected through the two-way switch 77 so that the loud speaker 76 reproduces the sound from the film being projected.

The leaf 37 is of slightly less width than the shelf 35 so as to leave a space between the leaf and the inner side of the door 32, and the shelf 35 is provided with a slot or opening 42, shown most clearly in Fig. 5, through which a drive belt 43 extends vertically. The belt 43 is adapted to pass around and be embraced in one groove of a double pulley wheel 44 which is journaled on a stud 45 mounted on the inner side of the door center panel 46 by a plate 47 secured by screws 48. The double pulley wheel 44 is driven from the projector 41 by a belt 49 passing around the relatively large pulley 50.

The lower end of the belt 43 is received in and drives a grooved pulley wheel 51 which rotates a horizontally disposed shaft 52 through an overrunning clutch 51A of the usual cam and roller type, which permits the projector to be run in reverse without reversing the rotation of the rewind mechanism and consequent tangling up of the film being rewound.

The rewind driving mechanism is so proportioned that the film being rewound travels at a speed of approximately twenty-five per cent faster than the speed of the film being projected, whereby the rewinding of one roll of film is completed before the complete projection of another roll of film of substantially the same length.

One end of the shaft 52 is journaled in a socket 53 mounted on and recessed in the inner side of the door 32 and the other end of which is journaled in a bearing 54 secured to a depending wall 55 vertically disposed and abutting the underside of the shelf 35. The end of the rod extends through the bearing 54 and the projecting end thereof is squared to receive and fit in the center opening of a motion picture film reel. Set collars 56 and 57 are provided on the shaft 52 for holding the shaft in its bearings.

A second shaft 58 is journaled in horizontally spaced parallel relation to the shaft 52 by a socket bearing 59 recessed in the inner side of the door 32 and a bearing 60 also secured to the depending wall 55 in the same manner as the bearing 54. Set collars 61 and 62 are likewise provided for holding the shaft in its bearings, and the end thereof journaled in the bearing 60 protrudes therebeyond and is squared, as shown at 63, for also receiving a film reel. The shaft 58 is provided with a wood friction disc 64 rigidly mounted thereon by a set screw 65. The disc 64 is frictionally engaged by the free end 66 of a leaf spring 67, the other end of which is anchored to a vertically disposed wall 68 positioned in a plane perpendicular to the wall 55 and rigidly secured to the inner side of the door 32 by an angle bracket 69. Frictional engagement of this spring against the disc 64 serves to dampen the rotation of the shaft 58 which is very desirable in rewinding of picture film so as to prevent an overrunning action of the loaded spool on the squared end 63 of the shaft during the rewinding action.

In the use of this cabinet, the front door 32 is swung outwardly on its vertical pivots to the desired horizontal angle for bringing the projector 41 into horizontal registry with the screen or wall upon which the pictures are to be projected. The leaf 37 is adjusted upwardly or downwardly to raise or lower the vertical angle of projection by rotation of the thumb screw 40. One of the drawers is then opened, it being noted that the operator standing in a position to face the projection machine will be closely adjacent to the drawer when pulled open. The cover of the drawer is lifted, and due to the systematic arrangement and tabulation of the film reels, the desired reel of film may be quickly selected and placed upon the projector.

During projection of the film, a second reel may be selected and if there is a continuity of subject-matter, the rolls of films are usually arranged in consecutive order in the drawers. As soon as the first roll has been projected, it is removed and placed on the squared end 63 of the shaft 58, an empty spool or reel being placed on the squared end of the shaft 52. As the second roll of film is being projected from the machine, the first projected roll may be rewound due to the belt driven connections between the shaft 52 and the projecting machine. A snug rewinding of the film is automatically insured by reason of the friction brake or damping action of the free end 66 of the spring 67 bearing on the disc 64.

At the end of the projection period, and after the last roll has been rewound, the cabinet door 32 is simply swung to closed position thereby housing the projector within the cabinet, thus keeping it safe from harmful injury and free from dust and dirt.

The individual compartments in the various drawers may be numbered if desired so that an index or catalogue of the reels may be made in order that any particular subject-matter indexed and cross-indexed may be immediately located without search.

In the use of motion picture projectors, it is particularly important to have adequate ventilation of the projector on account of the extreme heat developed by the light bulb, and it is to be especially noted that my construction and arrangement provides excellent ventilation when projection is taking place.

Although but one specific embodiment of this invention has been herein shown and described, it will be understood that numerous details of the construction shown may be altered or omitted without departing from the spirit of this invention as defined by the following claims.

I claim:

1. In a motion picture projector cabinet adapted to project motion pictures substantially perpendicularly with respect to the front wall thereof, a door pivotally mounted upon a substantially vertical axis, one surface of said door when closed constituting a finish surface for a portion of the front wall of said cabinet, a shelf secured to the inner surface of said door, a motion picture projector mounted upon said shelf, means interconnecting said motion picture projector and shelf including mechanism for adjusting the vertical position of said projector with respect to said shelf, said door when closed serving to enclose and house said projector within said cabinet and so mounted that opening of said door will move said projector into projecting position substantially perpendicular to the front wall of said cabinet and provide means for adjustably directing said projector laterally.

2. In a motion picture projector cabinet adapted to project pictures substantially perpendicularly from the front wall thereof, a door pivotally mounted on a substantially vertical axis having one surface thereof constituting a finished surface for a portion of the front wall of said cabinet, and a motion picture projector mounted on said door and adapted to be enclosed in and housed by said cabinet by pivotal movement of said door, means for mounting said projector upon the door providing mechanism for vertically adjusting said projector with respect to said cabinet, said projector so mounted that opening of said door will move said projector into projecting position substantially perpendicular to the front wall of said cabinet, whereby pivotal movement of said door provides means for adjustably directing said projector laterally.

JAMES W. HUGHES.